(12) United States Patent
Mori et al.

(10) Patent No.: US 9,371,756 B2
(45) Date of Patent: Jun. 21, 2016

(54) EXHAUST GAS PURIFICATION DEVICE FOR INTERNAL COMBUSTION ENGINE

(75) Inventors: Toshihiro Mori, Gotenba (JP); Hidetaka Fuse, Susono (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 262 days.

(21) Appl. No.: 14/110,617

(22) PCT Filed: Apr. 15, 2011

(86) PCT No.: PCT/JP2011/002246
§ 371 (c)(1),
(2), (4) Date: Oct. 8, 2013

(87) PCT Pub. No.: WO2012/140702
PCT Pub. Date: Oct. 18, 2012

(65) Prior Publication Data
US 2014/0026545 A1    Jan. 30, 2014

(51) Int. Cl.
| *F01N 3/00* | (2006.01) |
| *F01N 3/10* | (2006.01) |
| *F01N 3/20* | (2006.01) |
| *F01N 3/38* | (2006.01) |
| *F01N 9/00* | (2006.01) |
| *F01N 3/36* | (2006.01) |

(52) U.S. Cl.
CPC ............... *F01N 3/10* (2013.01); *F01N 3/2033* (2013.01); *F01N 3/36* (2013.01); *F01N 3/38* (2013.01); *F01N 9/00* (2013.01); *F01N 2900/10* (2013.01); *F01N 2900/1602* (2013.01); *Y02T 10/26* (2013.01); *Y02T 10/47* (2013.01)

(58) Field of Classification Search
CPC ........... F01N 3/10; F01N 3/2033; F01N 3/38; F01N 3/36; F01N 9/00; F01N 2900/10; F01N 2900/1602; Y02T 10/26; Y02T 10/47
USPC .................................................... 60/286, 303
See application file for complete search history.

(56) References Cited

U.S. PATENT DOCUMENTS

| 4,510,749 A | * | 4/1985 | Taguchi et al. | 60/286 |
| 5,133,184 A | * | 7/1992 | Geiger | 60/274 |
| 5,419,121 A | * | 5/1995 | Sung et al. | 60/274 |
| 5,609,021 A | * | 3/1997 | Ma | 60/274 |
| 5,771,683 A | * | 6/1998 | Webb | 60/274 |

(Continued)

FOREIGN PATENT DOCUMENTS

| JP | 2001-65335 A | 3/2001 |
| JP | 2007-177763 A | 7/2007 |

(Continued)

*Primary Examiner* — Thomas Denion
*Assistant Examiner* — Diem Tran
(74) *Attorney, Agent, or Firm* — Sughrue Mion, PLLC

(57) ABSTRACT

There is provided an exhaust purifying system for an internal combustion engine comprising a fuel supply valve for supplying fuel to an exhaust passage for an internal combustion engine of a vehicle, an ignition device for igniting the fuel supplied from the fuel supply valve, and a controller for heating the ignition device to selectively realize at least an ignition temperature $T_i$ in which the fuel can be ignited and a waiting temperature $T_s$ in which the fuel cannot be ignited. The controller controls the waiting temperature $T_s$ to be the lower as a predicted deceleration time $t_p$ that is the time for which a decelerating state of the vehicle lasts is larger.

6 Claims, 5 Drawing Sheets

(56) References Cited

U.S. PATENT DOCUMENTS

| | | | |
|---|---|---|---|
| 8,353,151 B2 * | 1/2013 | Tsujimoto et al. | 60/286 |
| 2010/0077732 A1 * | 4/2010 | Jeong et al. | 60/286 |
| 2010/0186386 A1 * | 7/2010 | Tsujimoto et al. | 60/286 |
| 2010/0192550 A1 * | 8/2010 | Tsujimoto et al. | 60/287 |
| 2011/0011063 A1 | 1/2011 | Tsujimoto et al. | |
| 2012/0090302 A1 | 4/2012 | Tsujimoto et al. | |
| 2013/0022505 A1 | 1/2013 | Tsujimoto | |

FOREIGN PATENT DOCUMENTS

| | | |
|---|---|---|
| JP | 2009-287515 A | 12/2009 |
| JP | 2010-59886 A | 3/2010 |
| JP | 4635868 B2 | 2/2011 |
| WO | 2010026466 A1 | 3/2010 |
| WO | 2011/033681 A1 | 3/2011 |
| WO | 2011/125089 A1 | 10/2011 |

* cited by examiner

_(1)_

EXHAUST GAS PURIFICATION DEVICE FOR INTERNAL COMBUSTION ENGINE

CROSS REFERENCE TO RELATED APPLICATIONS

This application is a National Stage of International Application No. PCT/JP2011/002246 filed Apr. 15, 2011, the contents of all of which are incorporated herein by reference in their entirety.

TECHNICAL FIELD

The present invention relates to an exhaust purifying system that is provided in an exhaust passage of an internal combustion engine and includes an ignition device for increasing a temperature of an exhaust gas.

BACKGROUND ART

There are proposed various kinds of exhaust purifying systems in which an ignition device, which supplies fuel for combustion, is arranged upstream of an exhaust purifying catalyst located in an exhaust passage of an engine. For example, in a system disclosed in PTL 1, a first control state in which fuel is ignited by heating by a glow plug or a third state in which the heating by the glow plug is stopped is realized in an ignitable operating region. On the other hand, in an unignitable operating region, a second state in which the heating by the glow plug is performed but the fuel is not ignited or the above-mentioned third state is realized.

In a system disclosed in PTL 2, as an outside air temperature is lower, a preheat time for the catalyst is set to be the longer.

CITATION LIST

Patent Literature

PTL 1: Japanese Patent Laid-Open No. 2010-059886
PTL 2: Japanese Patent Laid-Open No. 2001-065335

SUMMARY OF INVENTION

Technical Problem

The ignition device is preheated to awaiting temperature lower than an ignition temperature, and is increased in temperature from the waiting temperature to the ignition temperature when it becomes an ignitable operating state. By doing so, the energy consumption can be saved as compared to a case where the ignition device all the time keeps on being heated to the ignition temperature. However, when the time for which the ignitable operating state lasts is too short, the time for which the ignition temperature is maintained becomes insufficient, thereby making it impossible to perform the ignition of the fuel.

An object of the present invention is to save energy consumption and suppress a failure of ignition in an exhaust device having an ignition device.

Solution to Problem

A first aspect of the present invention is provided with an exhaust purifying system for an internal combustion engine comprising a fuel supply valve for supplying fuel to an exhaust passage for an internal combustion engine of a vehicle, an ignition device for igniting the fuel supplied from the fuel supply valve, and a controller for heating the ignition device to selectively realize at least an ignition temperature in which the fuel can be ignited in a predetermined ignitable atmosphere and a waiting temperature in which the fuel can not be ignited in the predetermined ignitable atmosphere, wherein the controller controls the waiting temperature to be the lower as a predicted deceleration time that is the time for which a decelerating state of the vehicle lasts is larger.

Preferably the controller estimates the predicted deceleration time to be the longer as a vehicle speed is higher.

Preferably the controller does not heat the ignition device in a case where the predicted deceleration time is smaller than a predetermined reference value.

Preferably the controller does not heat the ignition device in a case where it is estimated that the decelerating state does not occur, regardless of the predicted deceleration time.

Preferably the controller controls the waiting temperature to be the lower as a temperature of an exhaust purifying catalyst arranged in the exhaust passage downstream of the ignition device is higher.

Preferably the controller controls the ignition device to the ignition temperature regardless of the predicted deceleration time in a case where the vehicle is decelerating and is in a shift-change.

It should be noted that various kinds of means for solving the problem in the present invention maybe used to be combined as many as possible.

Advantageous Effects of Invention

According to the present invention, in the exhaust device with the ignition device a failure of the ignition can be suppressed while saving the energy consumption.

DESCRIPTION OF EMBODIMENTS

Figure 1:
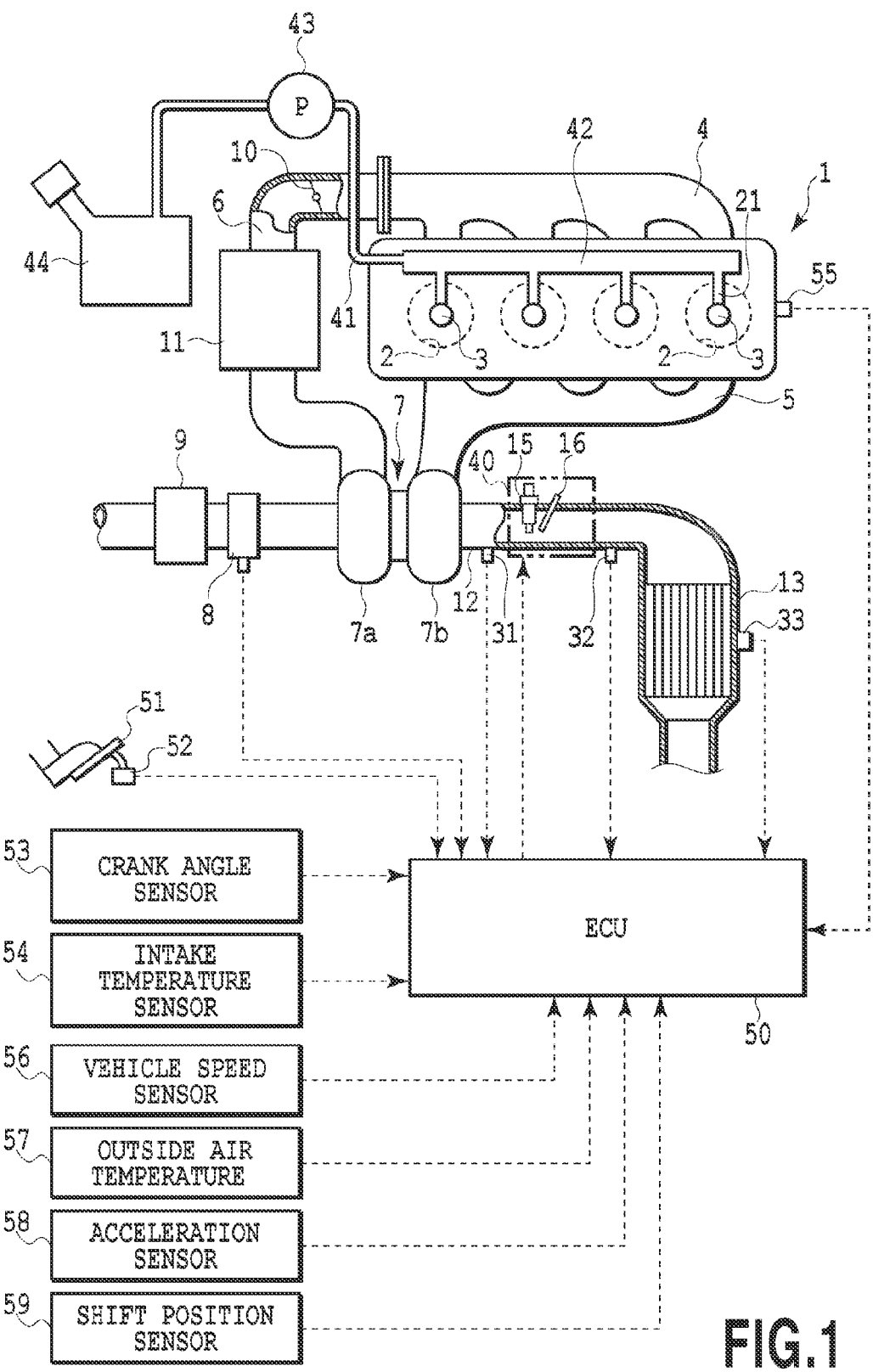
FIG. 1 is a schematic diagram showing an embodiment of the present invention.

Preferred embodiments of the present invention will be described below in detail. FIG. 1 illustrates a first embodiment of the present invention. In FIG. 1, an engine body 1 is a compression ignition internal combustion engine (a diesel engine) using light oil as fuel, but may be another type of internal combustion engine. The engine body 1 has a combustion chamber 2 in each of four cylinders. An electronically controlled fuel injector 3 for injecting fuel is arranged in each of the combustion chambers 2. An intake manifold 4 and an exhaust manifold 5 are connected to the combustion chambers 2. The intake manifold 4 is connected through an intake pipe 6 to an outlet of a compressor 7a of an exhaust turbocharger 7. An inlet of the compressor 7a is connected through an airflow meter 8 to an air cleaner 9.

A throttle valve 10 driven by a step motor (not shown) is arranged in the intake pipe 6. An intercooler 11 is arranged around the intake pipe 6 for cooling the intake air flowing in the intake pipe 6. Engine cooling water is guided into the intercooler 11, so that the intake air is cooled by the engine cooling water.

Each of the fuel injectors 3 is connected through a fuel supply pipe 41 to a common rail 42, and the common rail 42 is connected through an electronically controlled fuel pump 43 of a variable injection quantity to a fuel tank 44. The fuel reserved in the fuel tank 44 is supplied to the common rail 42 by the fuel pump 43, and the fuel supplied to the common rail 42 is supplied through each fuel supply pipe 41 to the fuel injectors 3.

The exhaust manifold 5 is connected to an inlet of an exhaust turbine 7b of the exhaust turbocharger 7. An outlet of the exhaust turbine 7b is connected through an exhaust pipe 12 to an exhaust purifying catalyst 13. The exhaust purifying catalyst 13 is formed of, for example, an oxidation catalyst, a three-way catalyst or a NOx catalyst. A honeycomb body formed of cordierite or metal is used as a basic material of the catalyst 13.

A fuel injector 15 for supplying fuel into the exhaust pipe 12 is arranged in the exhaust pipe 12 upstream of the exhaust purifying catalyst 13 with its injection port exposed to an inside of the exhaust pipe 12. The fuel in the fuel tank 44 is supplied through the fuel pump 43 to the fuel injector 15.

A glow plug 16 is provided in the exhaust pipe 12 downstream of the fuel injector 15. The glow plug 16 is arranged such that fuel added from the fuel injector 15 makes contact with a tip end portion thereof, thus enabling the fuel to be ignited. The glow plug 16 can assist in the ignition of the fuel.

The glow plug 16 has an axis center that is inclined toward the upstream side of the exhaust pipe 12, but may be arranged in any inclination, for example, is arranged to be perpendicular to the flowing direction. A direct-current power source and a booster circuit (any thereof is not shown) are connected to the glow plug 16 for supplying power thereto. Instead of the glow plug, a ceramic heater or the other temperature-increasing means of an electric heating type may be used as the means for ignition. For enhancing atomization of the fuel, a collision plate may be arranged in the exhaust pipe 12 for making the fuel injected from the fuel injector 15 collide therewith. The fuel injector 15 and the glow plug 16 constitute an exhaust temperature-increasing device 40, which is controlled by an ECU 50 to be described later.

A small-sized oxidation catalyst (not shown), a frontal projected area of which is smaller than a cross-sectional area of the surrounding exhaust pipe 12, may be arranged in the exhaust pipe 12 upstream of the exhaust purifying catalyst 13. Apart of exhaust gases passing through the exhaust pipe 12 flows into the small-sized oxidation catalyst. The small-sized oxidation catalyst may be arranged downstream of the fuel injector 15 and the glow plug 16. In a case where the small-sized oxidation catalyst is activated to be at a sufficiently high temperature, the fuel can be ignited without supplying power to the glow plug 16. Even if the small-sized oxidation catalyst is not at a sufficiently high temperature, the ignition can be assisted by the glow plug 16. As the catalyst substances, for example, $Pt/CeO_2$, $Mn/CeO_2$, $Fe/CeO_2$, $Ni/CeO_2$, $Cu/CeO_2$, or the like can be employed.

An exhaust temperature sensor 31 for detecting an exhaust temperature is mounted in the exhaust pipe 12 upstream of the fuel injector 15. An A/F sensor 32 is arranged in the exhaust pipe 12 downstream of the glow plug 16 and upstream of the exhaust purifying catalyst 13 for detecting an air-fuel ratio in the exhaust passage. A catalyst temperature sensor 33 is arranged near the exhaust purifying catalyst 13 for detecting a temperature of the exhaust purifying catalyst 13.

An electronic control unit (ECU) 50 which is a controller comprises a well-known digital computer, which is equipped with a ROM (Read Only Memory), a RAM (Random Access Memory), a CPU (microprocessor), an input port and an output port, that are interconnected via a bidirectional bus.

A load sensor 52, which generates an output voltage proportional to a depressing amount of an accelerator pedal 51, is arranged in the accelerator pedal 51. A crank angle sensor 53 is arranged near a crankshaft of the engine body 1, which generates an output pulse for, for example, every 15-degree turn of the crankshaft. An intake temperature sensor 54 is arranged near the throttle valve 10. A water temperature sensor 55 is arranged in a cylinder block of the engine body 1. A vehicle speed sensor 56 is arranged near a driving wheel. An outside air temperature sensor 57 is arranged outside of a vehicle compartment. An acceleration sensor 58 is arranged in the vehicle body. A shift position sensor 59 is arranged near a shift lever (not shown). An output signal of each sensor is input through the corresponding AD convertor to the input port of the ECU 50.

On the other hand, the ECU 50 is connected to the fuel injectors 3 and 15, the glow plug 16, the fuel pump 43, and the step motor for driving the throttle valve 10, via the corresponding DA convertors and drive circuits respectively. The operation of these actuators are controlled by the ECU 50. Various kinds of programs, reference values and initial values including maps shown in FIG. 3 to FIG. 8 are prepared in advance, and stored in the ROM of the ECU 50. A function composed of a mathematical expression may be used instead of the each map.

The ECU 50 calculates an instruction quantity of fuel supply on the basis of a vehicle state including detection values of the airflow meter 8, the exhaust temperature sensor 31, the A/F sensor 32, the load sensor 52 and the crank angle sensor 53, particularly parameters representing an operating state of the engine body 1, and outputs a control signal to open the fuel injector 3 for a time period corresponding to the instruction quantity. The fuel of the quantity according to the instruction quantity of fuel injection is supplied from the fuel injectors 3 in response to the control signal to drive the engine body 1. In the operation of the engine body 1, an opening degree of the throttle valve 10 is throttled during the deceleration of the vehicle by the control of the ECU 50 to decrease an exhaust flow quantity and stop the fuel supply from the fuel injectors 3 (fuel cut control).

The ECU 50 controls the fuel injector 15 and the glow plug 16 in parallel with the aforementioned process to supply fuel from the fuel injector 15, and a part or all of the fuel to be supplied is raised in temperature or is ignited by the glow plug 16. A required quantity of the fuel supply from the fuel injector 15 (that is, a fuel supply quantity set in accordance with the aim of a fuel supply requirement) may be a fixed value or variable value. In a case of the variable value, the required quantity can be defined based upon, for example, an estimated temperature of the exhaust purifying catalyst 13. The fuel supply requirement to the fuel injector 15 can be output for the aim of a temperature increase of the exhaust purifying catalyst 13 at a low temperature such as a cold start, and besides, oxidation and burning of particulate matter (PM)

deposited in the exhaust purifying catalyst 13, and NOx reduction and SOx poisoning recovery to the exhaust purifying catalyst 13 (in a case where the exhaust purifying catalyst 13 is a NOx adsorption reduction catalyst), and in a case of the aim other than the temperature increase, the power supply to the glow plug 16 may not be necessary.

Figure 2:
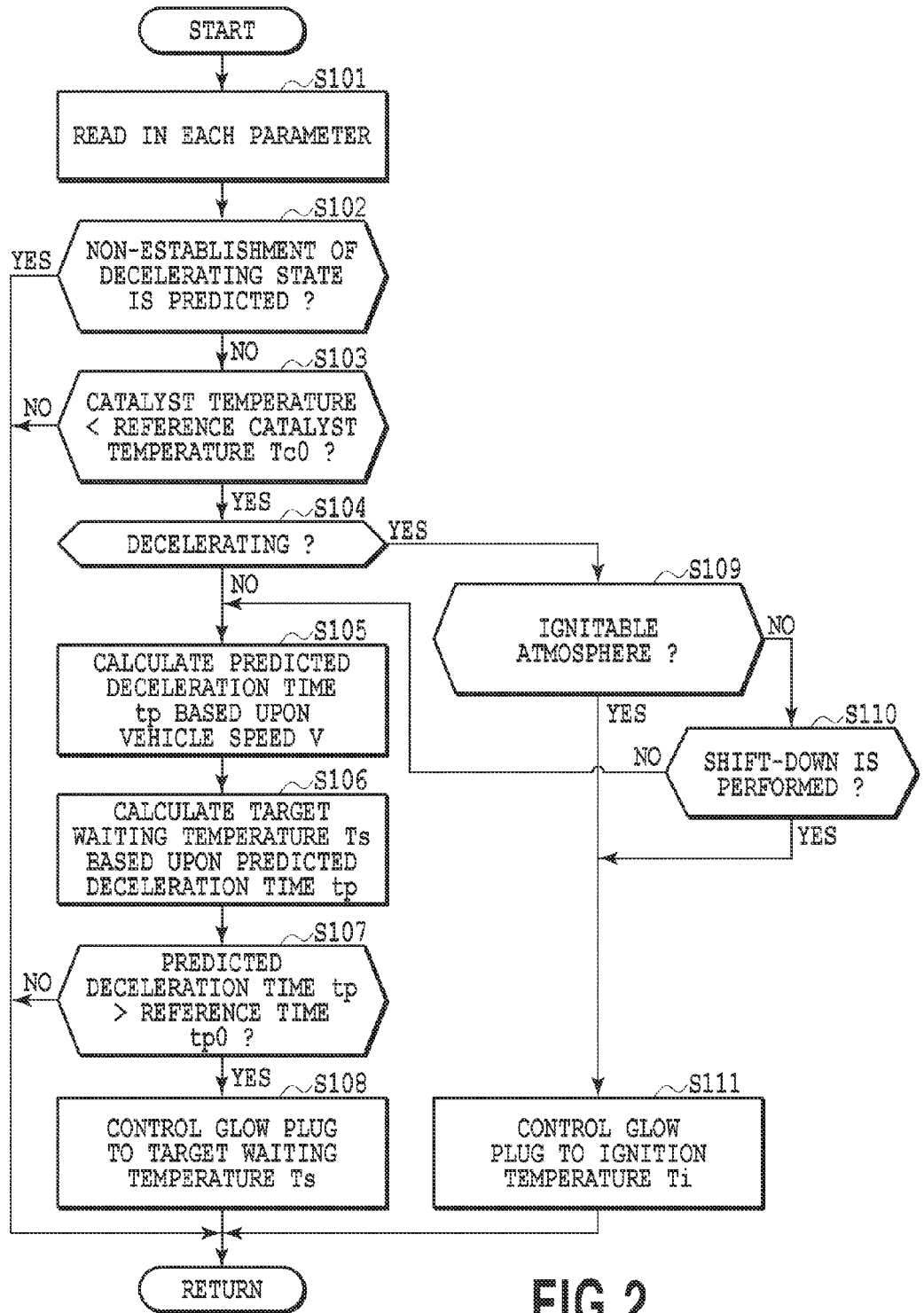
FIG. 2 is a flow chart showing a control process of a glow plug temperature.

A glow plug temperature control routine in FIG. 2 is executed repeatedly for each predetermined time $\Delta t$ during the operating of the engine body 1. In FIG. 2, the ECU 50 initially reads a value of each parameter showing a state of a vehicle (S101). Next, the ECU 50 determines whether or not the non-establishment of the decelerating state is predicted (S102). In this determination, the non-establishment of the decelerating state is predicted in a case where acceleration "a" detected by the acceleration sensor 58 is a positive value and an absolute value of which is a predetermined value or more (in other words, a vehicle is certainly at accelerating), or in a case where the determination that the vehicle is in a steady traveling state based upon a temporal change quantity of each of an engine rotation speed Ne, an intake air quantity KL, and the acceleration "a" continues to be made for a predetermined time or more. In this case, since the possibility that the decelerating state occurs in the near future is estimated to be low, for example as in a case of traveling in an express way, a positive determination is made at step S102, and the process returns, wherein the heating of the glow plug 16 is not performed. Therefore the energy consumption can be suppressed in a case where the possibility of the ignition is low. The acceleration "a" may be calculated by a changing quantity of a vehicle speed v detected by the vehicle speed sensor 56.

If NO at step S102, then the ECU 50 determines whether or not a catalyst temperature Tc is smaller than a predetermined reference catalyst temperature Tc0 (S103). If NO, that is, if the catalyst temperature Tc is equal to or larger than the reference catalyst temperature Tc0, the heating is not necessary and therefore the process returns, thus heating of the glow plug 16 is not performed.

If YES at step S103, then the ECU 50 determines whether a vehicle is decelerating (S104). For igniting the fuel supplied from the fuel injector 15, it is desirable that the exhaust temperature is high, the exhaust flow quantity is low, and the oxygen concentration is high. When the vehicle is in a decelerating state, the ignition is suitably performed, since the engine body 1 is controlled such that the exhaust gas quantity is low and the oxygen concentration is high. Since the decelerating state is suitable for the ignition, in the present system the glow plug 16 is basically controlled to an ignition temperature during deceleration, and when not in deceleration, the glow plug 16 is controlled to a waiting temperature or is not heated at all. The determination at step S103 is made based upon the acceleration "a" detected by the acceleration sensor 58. If the acceleration "a" is a negative value and an absolute value of which is larger than a predetermined value, it is determined that the vehicle is in deceleration. The acceleration "a" may be calculated by a changing quantity of a vehicle speed V detected by the vehicle speed sensor 56.

When not in deceleration, then the ECU 50 calculates a predicted deceleration time tp (S105). The predicted deceleration time tp is calculated based upon a basic deceleration time tb calculated based upon a vehicle speed v, a road surface load rate R1 calculated by a predetermined function, and a catalyst temperature Tc detected by the catalyst temperature sensor 33.

Specifically the ECU 50 refers to a basic deceleration time map by using the present vehicle speed v detected by the vehicle speed sensor 56 (refer to FIG. 3), and thereby calculates the basic deceleration time tb. The basic deceleration time tb is set to be the longer as the vehicle speed v is higher. This is because it is empirically predicted that the higher the vehicle speed v is, the longer the deceleration time becomes.

The road surface load rate R1 is defined as a rate of the present fuel injection quantity Q to a fuel injection quantity Q0 (refer to FIG. 4) at a flat-ground steady driving time, which is determined from a vehicle speed v. The road surface load rate R1 has a positive correlation to a running resistance, and is larger than one in a case of an uphill, a high friction road, and an opposing wind. The ECU 50 refers to a road surface correction coefficient map (refer to FIG. 5) which is prepared in advance and stored in a ROM, based upon the road surface load rate R1, and thereby calculates a road surface correction coefficient Cr. The road surface correction coefficient Cr is set to be the smaller as the road surface load rate R1 is larger. This is because the higher the road surface load R1 is, the shorter the deceleration time is expected to be.

The ECU 50 refers to a catalyst temperature correction coefficient map (refer to FIG. 6) which is prepared in advance and stored in the ROM, based upon the catalyst temperature Tc, and thereby calculates a catalyst temperature correction coefficient Cc. The catalyst temperature correction coefficient Cc is set to be the smaller as the catalyst temperature Tc is higher. This is because in a case where the temperature of the exhaust purifying catalyst 13 is high, a reduction of the ignition probability is allowable.

The ECU 50 multiplies the basic deceleration time tb by the road surface correction coefficient Cr and the catalyst temperature correction coefficient Cc to calculate the predicted deceleration time tp (S105). The predicted deceleration time tp becomes a larger value as the vehicle speed v is larger.

Next, the ECU 50 refers to a waiting temperature map (refer to FIG. 7) which is prepared in advance and is stored in the ROM, based upon the predicted deceleration time tp, and thereby calculates a target waiting temperature ts (S106). The target waiting temperature ts is set to be the lower as the predicted deceleration time is longer.

Next, the ECU 50 determines whether the predicted deceleration time tp is larger than a reference time tp0 (S107). The reference time tp0 is set to a sum of a required temperature increasing time required for increasing a temperature of the glow plug 16 from the target waiting temperature Ts to an ignitable temperature, and a required maintaining time required for igniting fuel at an ignitable temperature. The required temperature increasing time and the required maintaining time may be fixed values, or may be dynamically set based upon, for example, an outside air temperature and/or an intake temperature. Alternatively the reference time tp0 may be set to the above-mentioned required temperature increasing time. If NO at step S107 (that is, if the predicted deceleration time tp is equal to or smaller than the reference time tp0), the process returns, and the heating of the glow plug 16 is not performed.

If YES at step S107, the ECU 50 performs the control output to the glow plug 16 to control the glow plug 16 to the target waiting temperature Is (S108).

On the other hand, If YES at step S104, that is, if a vehicle enters into a decelerating state, the ECU 50 determines whether an inside of the exhaust pipe 2 is in an ignitable atmosphere (S109). This determination is made based upon "whether an oxygen concentration is higher than a reference oxygen concentration", "whether an exhaust gas temperature is higher than a reference exhaust gas temperature", and "whether an exhaust flow quantity is smaller than a reference exhaust flow quantity". If all these conditions are satisfied, the positive determination is made. If YES, the ECU 50 controls the glow plug 16 to an ignition temperature Ti (S111). If NO, then the ECU 50 determines whether a shift-down is performed based upon a detection value of the shift position sensor 59 (S110). If YES, the ECU 50 controls the glow plug 16 to the ignition temperature Ti (S111), and If NO, the process goes to step S105 through step S108 (that is, control to a target waiting temperature ts).

As a result of the above-mentioned process, according to the present embodiment, the glow plug 16 is controlled to the ignition temperature Ti if the vehicle is decelerating, and is controlled to the target waiting temperature Ts if the vehicle is not at decelerating.

Figure 8:
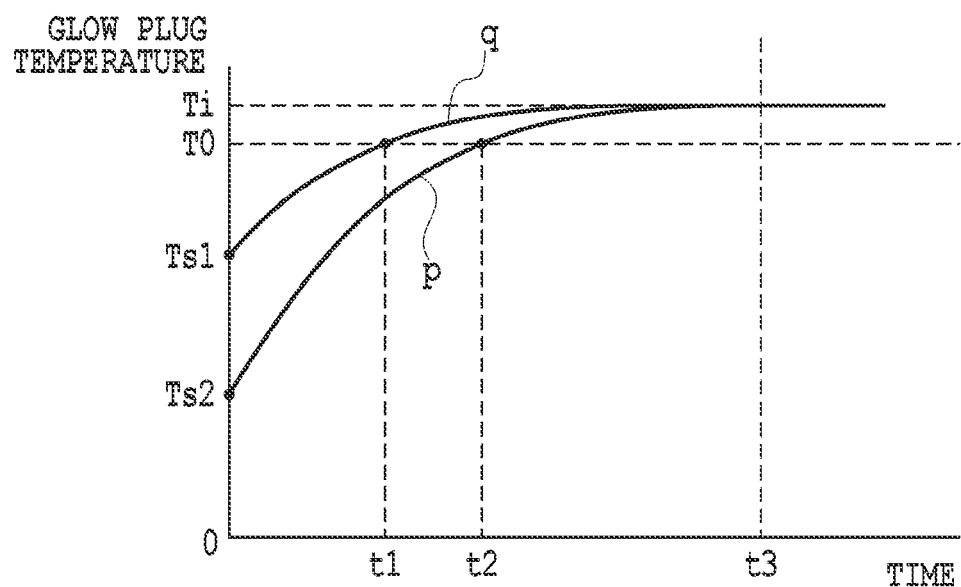
FIG. 8 is a time chart showing transition of a glow plug temperature in each case where the waiting temperature is changed.

In the present embodiment, the waiting temperature Ts is controlled to be the higher as the predicted deceleration time tp, that is the time for which the decelerating state of the vehicle lasts, is shorter. Therefore, the temperature of the glow plug 16 reaches from the waiting temperature Ts to the ignition temperature Ti in a shorter time, thereby extending the time for which the ignition temperature Ti is maintained. For example, as shown in FIG. 8, in a case where the glow plug temperature is a low waiting temperature Ts2 (curve p), a relatively long time is required from a point where a vehicle enters into a decelerating state to a point t2 where the glow plug temperature exceeds an ignitable threshold T0. On the other hand, in a case where the glow plug temperature is a high waiting temperature Ts1 (curve q), the glow plug temperature exceeds the ignitable threshold T0 in a relatively short time from a point where the vehicle enters into a decelerating state. As a result, the time from a point t1 where the glow plug temperature exceeds the ignitable threshold T0 to a point t3 where the decelerating state terminates can extend to the time between t1 and t2. As a result of this, a failure of the ignition can be suppressed. On the other hand, as the predicted deceleration time tp is longer, the waiting temperature Ts is controlled to be the lower (S106 and FIG. 7). As a result of this, the energy consumption can be saved, and since the predicted deceleration time tp is long, the failure of the ignition can be suppressed to an allowable extent.

Figure 3:
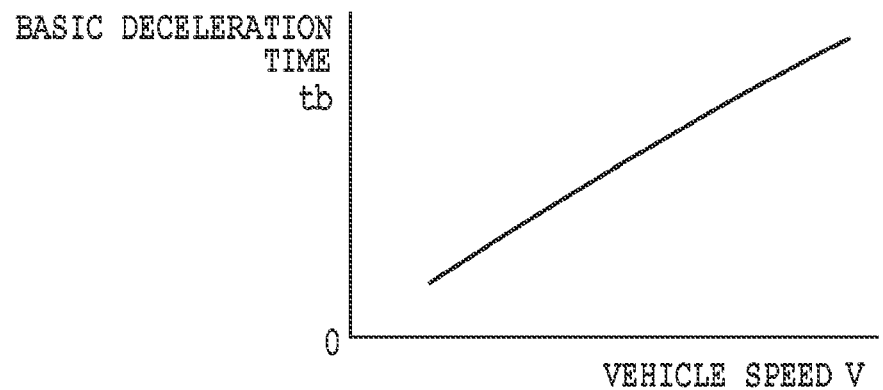
FIG. 3 is a graph showing a setting example of a basic deceleration time map.
Figure 4:
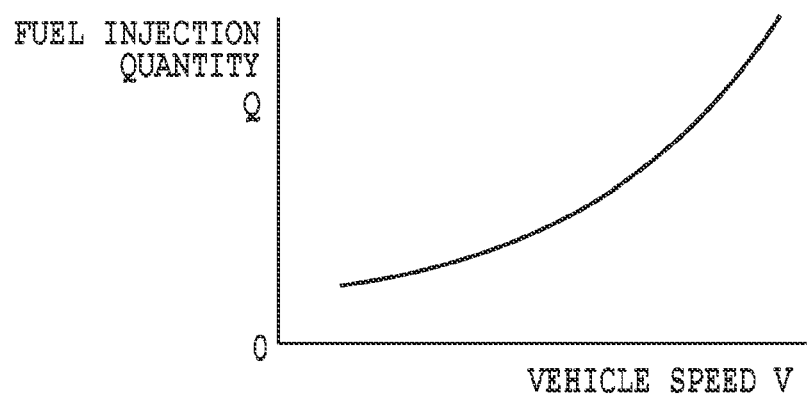
FIG. 4 is a graph showing a fuel injection quantity at a flat-ground steady driving, which is determined according to a vehicle speed.
Figure 5:
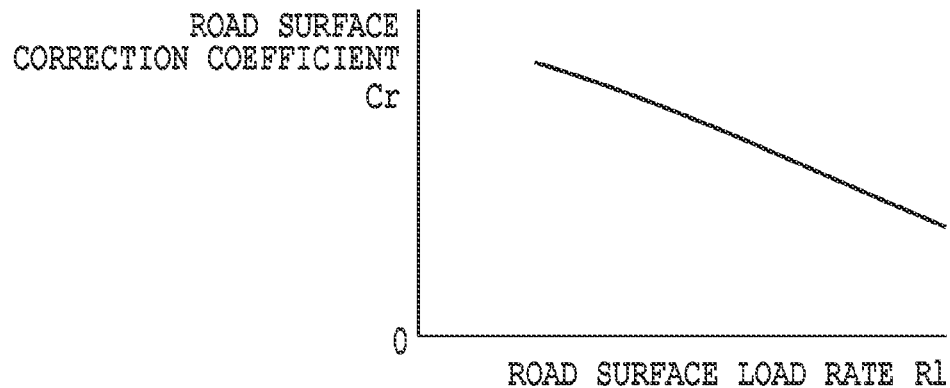
FIG. 5 is a graph showing a setting example of a road-surface correction coefficient map.

The ECU 50 estimates the predicted deceleration time tp to be the longer as the vehicle speed v is higher (S105 and FIG. 3). On an empirical basis, as the vehicle speed v is higher, the subsequent deceleration time becomes the longer. Therefore in the present embodiment, the higher the vehicle speed v is, the lower the waiting temperature Ts is controlled to be. As a result, the present invention can realize a desired effect, with a simple configuration.

The ECU 50 does not perform the heating of the glow plug 16 if the predicted deceleration time tp is smaller than the predetermined reference time tp0 (S107). Therefore the energy consumption can be suppressed in a case where the possibility of the ignition is low.

The ECU 50 does not perform the heating of the glow plug 16 if it is estimated that the decelerating state does not occur regardless of the predicted deceleration time tp (S102). Therefore the energy consumption can be suppressed if the possibility of the ignition is low. During acceleration or in a case where a steady driving lasts long (as in the case of traveling in an express way), it is estimated that the decelerating state does not occur. Therefore it is possible to estimate that the decelerating state does not occur, with a simple configuration. As to another aspect, the heating of the glow plug 16 may be prohibited by determining that the decelerating state does not occur at the traveling in an express way. This determination can be made based upon external information (for example, information from a GPS system).

Figure 6:
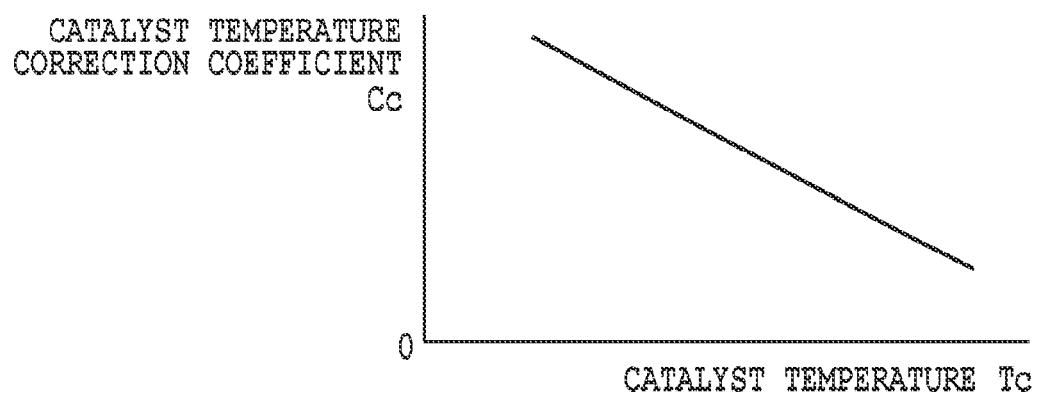
FIG. 6 is a graph showing a setting example of a catalyst-temperature correction coefficient map.
Figure 7:
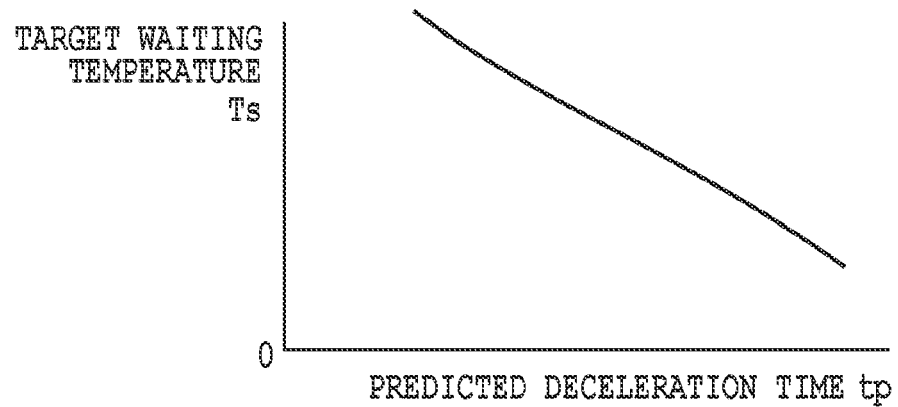
FIG. 7 is a graph showing a setting example of a waiting temperature map.

The ECU 50 controls the waiting temperature Ts to be the lower as the temperature of the exhaust purifying catalyst 13 arranged in the exhaust passage downstream of the glow plug 16 is higher (S105 and FIG. 6). In a case where the temperature of the exhaust purifying catalyst 13 is high, a reduction of the ignition probability is allowable. Therefore the energy consumption can be suppressed while victimizing the ignition probability.

The ECU 50 controls the ignition device to the ignition temperature regardless of the predicted deceleration time tp in a case where a vehicle is decelerating and is in a shift-change (S110 and S111). In a shift-change performed during a deceleration, a driver has a tendency of temporarily increasing a rotation of an engine for a smooth shift-change. As a result of this, the possibility of not satisfying the ignition condition is high, primarily because of a reduction in $O_2$ in an exhaust gas. However, in such a case, a subsequent deceleration is highly probable to occur. Therefore in the present embodiment, the glow plug 16 is controlled not to the waiting temperature Ts but to the ignition temperature Ti, thereby quickly igniting the fuel when the deceleration is performed.

The present invention is specifically explained to some degree, but it should be understood that various changes or alternations are possible without departing from the spirit and the scope of the invention defined in claims. The various technical means shown in the above-mentioned embodiment and the respective modifications can be combined with each other as much as possible, and can be executed independently from each other as much as possible. For example, the predicted deceleration time tp may be calculated taking into account other parameters, for example, outside information such as topographical information including a road surface gradient, or traffic quantity information including traffic jam information (for example, information from a GPS system and a traffic information system), and/or studied information including a drive pattern of a user. Further, the present invention can be applied to an internal combustion engine without a turbocharger or the other type of internal combustion engine.

REFERENCE SIGNS LIST

1 Engine body
12 Exhaust pipe
13 Exhaust purifying catalyst
3, 15 Fuel injector
16 Glow plug
40 Exhaust temperature-increasing device
50 ECU

The invention claimed is:

1. An exhaust purifying system for an internal combustion engine comprising:
   a fuel supply valve for supplying fuel to an exhaust passage for an internal combustion engine of a vehicle;
   an ignition device for igniting the fuel supplied from the fuel supply valve; and
   a controller for controlling the ignition device to realize, when the vehicle is in deceleration, a first temperature of the ignition device at which the fuel will be ignited in a predetermined ignitable atmosphere, and when the vehicle is not in deceleration, a second temperature of the ignition device at which the ignition device is heated but the fuel will not be ignited in said predetermined ignitable atmosphere, wherein
   the controller controls the second temperature to decrease as a predicted deceleration time that is the time for which a decelerating state of the vehicle is expected to last is longer.

2. An exhaust purifying system for an internal combustion engine according to claim 1, wherein
   the controller predicts the predicted deceleration time to be the longer as a vehicle speed is higher.

3. An exhaust purifying system for an internal combustion engine according to claim 1, wherein
 the controller does not heat the ignition device in a case where the predicted deceleration time is smaller than a predetermined reference value.

4. An exhaust purifying system for an internal combustion engine according to claim 1, wherein
 the controller does not heat the ignition device in a case where it is predicted that the decelerating state does not occur, regardless of the predicted deceleration time.

5. An exhaust purifying system for an internal combustion engine according to claim 1, wherein
 the controller controls the second temperature to decrease as a temperature of an exhaust purifying catalyst arranged in the exhaust passage downstream of the ignition device is higher.

6. An exhaust purifying system for an internal combustion engine according to claim 1, wherein
 the controller controls the ignition device to the first temperature regardless of the predicted deceleration time in a case where the vehicle is decelerating and is in a shift-change.

\* \* \* \* \*